United States Patent [19]

Daenens et al.

[11] Patent Number: 5,033,763
[45] Date of Patent: Jul. 23, 1991

[54] TRACKING TRAILER

[76] Inventors: Vern A. Daenens, 26034 Waldorf, Roseville, Mich. 48066; John E. Nemazi, 3660 Carmel, Troy, Mich. 48084

[21] Appl. No.: 337,933

[22] Filed: Apr. 14, 1989

[51] Int. Cl.$^5$ ............................................. B62D 13/04
[52] U.S. Cl. ..................................... 280/426; 280/91; 280/442
[58] Field of Search ..................... 280/426, 442, 423.1, 280/438.1, 441.1, 91

[56] References Cited

U.S. PATENT DOCUMENTS

| 1,382,909 | 6/1921 | Hennessy et al. | 280/91 |
| 2,233,193 | 2/1941 | Armington et al. | 280/438.1 X |
| 2,445,134 | 7/1948 | Curell, Jr. | 280/423.1 |
| 3,689,107 | 9/1972 | Humes | 280/426 |
| 4,244,596 | 1/1981 | Chung | 280/426 |
| 4,463,966 | 8/1984 | Stoddard | 280/442 |

FOREIGN PATENT DOCUMENTS

| 959973 | 3/1957 | Fed. Rep. of Germany | 280/426 |
| 787127 | 6/1935 | France | 280/442 |
| 558143 | 2/1957 | Italy | 280/426 |
| 430469 | 8/1967 | Switzerland | 280/426 |
| 747764 | 7/1980 | U.S.S.R. | 280/426 |
| 295961 | 8/1928 | United Kingdom | 280/442 |
| 2014921 | 9/1979 | United Kingdom | 280/442 |

Primary Examiner—Mitchell J. Hill
Attorney, Agent, or Firm—Brooks & Kushman

[57] ABSTRACT

A steerable trailer to be drawn by a vehicle is provided that has a generally horizontal frame to which are mounted two wheel supports. Each wheel support is pivotably mounted to the frame to rotate about a vertical axis and to support a wheel rotatably mounted to the wheel support to rotate about a horizontal axis. A steering pulley is also pivotably mounted to the frame to rotate about a vertical axis, and a tongue adapted for temporary attachment to the drawing vehicle is attached to the steering pulley. Any angular displacement imparted to the steering pulley by the drawing vehicle, through the tongue, is communicated from the steering pulley to each wheel support by a flexible tensile member, resulting in a proportional angular displacement of each wheel support. The flexible tensile member forms a continuous FIG. 8 loop to rotate each wheel support in a direction opposite to that of the steering pulley.

5 Claims, 4 Drawing Sheets

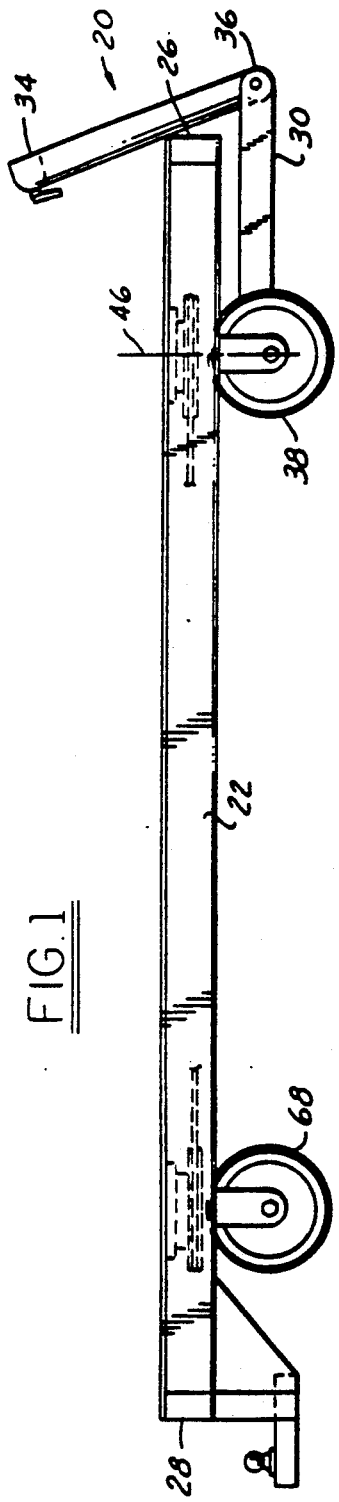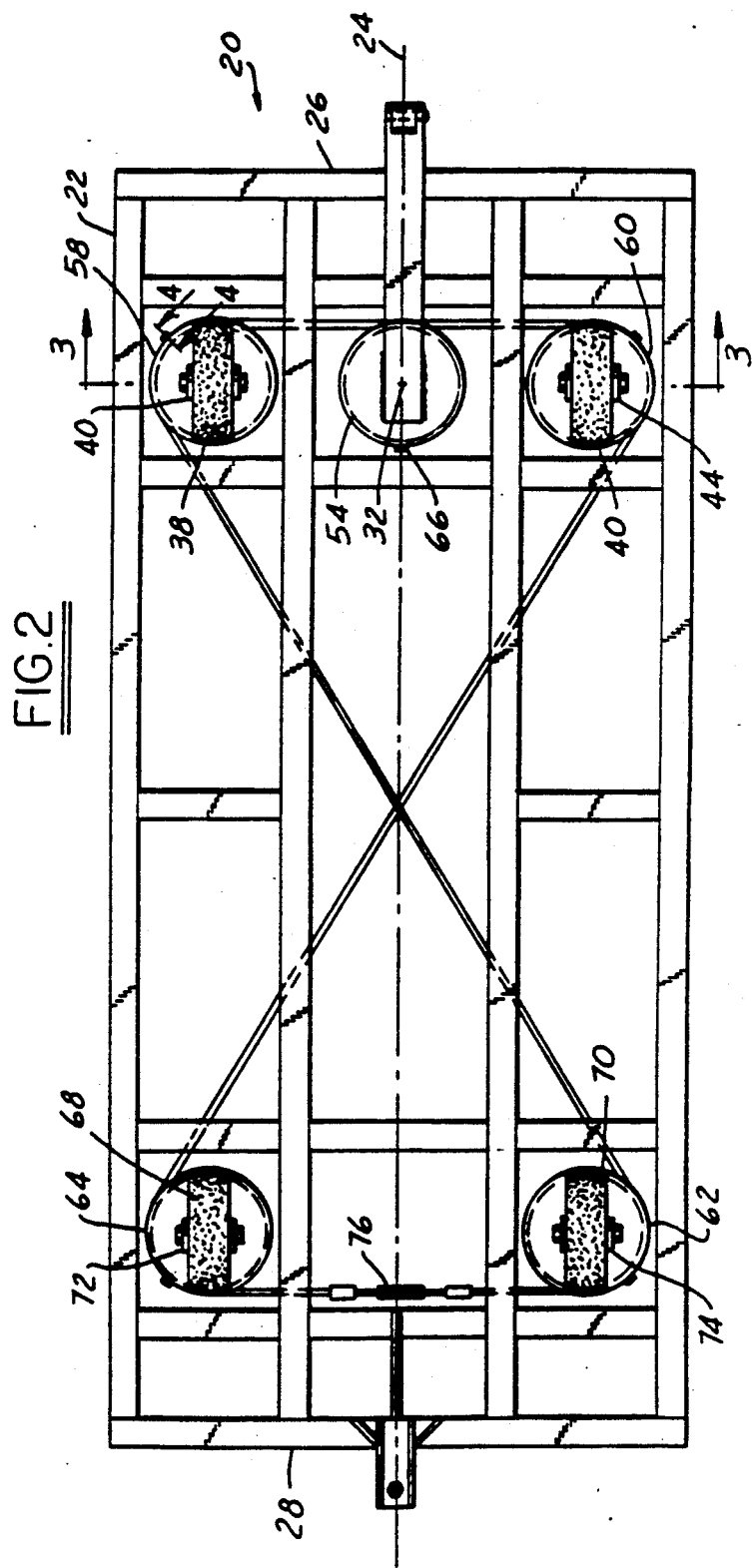

TRACKING TRAILER

This is a divisional of co-pending U.S. application Ser. No. 121,648 filed on Nov. 17, 1987, now U.S. Pat. No. 4,934,726 issued June 19, 1990.

BACKGROUND OF INVENTION

This invention relates to trailers, and more particularly to trailers having a plurality of wheels to be towed by a vehicle, wherein all of the trailer wheels are simultaneously steered to achieve accurate tracking.

Over the years there has been a great deal of effort to develop trailers which accurately track behind a towing vehicle. In many industrial applications, it is not uncommon to pull a train of trailers behind a towing vehicle to distribute parts throughout a large plant. It is quite important for the trailers to accurately track behind the towing vehicle, particularly when the train of trailers is long, in order to prevent the trailers from colliding with obstacles. In order to achieve accurate trailer tracking, a number of trailer manufacturers have gone to a four wheel steered trailer. The wheels are steered in response to tongue rotation. Typically, the system of steering linkages interconnect the wheels and the tongue, and in some instances a combination of steering linkages and cable arrangement is employed to interconnect the wheels and the tongue, as shown in U.S. Pat. Nos. 3,820,811, 3,529,848 and 2,673,091.

The mechanical joints and a tie rod system necessarily have some mechanical clearance which allows wheel wobble, which invariably increases with wear. Previous attempts to develop an all-cable steering system to eliminate the mechanical linkages is shown in U.S. Pat. No. 3,077,354, which utilizes a very complicated cable/chain arrangement having a complex slack adjustment system.

OBJECTS, FEATURES AND ADVANTAGES OF INVENTION

The object of the present invention is to provide a tracking trailer to be drawn by a vehicle which enables a large number of trailers to be drawn in a train which accurately tracks the path of the towing vehicle.

Another object of the present invention is to provide a tracking trailer which accurately follows a towing vehicle with minimum wheel scrub.

It is yet another object of the present invention to create a trailer having minimal steering system clearance and wheel play.

A feature of the present invention is that conventional heavy-duty swivel casters can be used as wheels for the trailer.

Another feature of the present invention is the simpleness of the design, and the minimal number of working parts.

An advantage of the present invention is that a four wheel steering trailer may be fabricated with a minimum number of working parts having precise coordination of the rotation of the wheels and the vehicle tongue to achieve precise tracking of long trailer trains.

Other advantages of the present invention is will be evident from review of the following description.

SUMMARY OF INVENTION

The present invention is directed to a steerable trailer to be drawn by a vehicle. The trailer is provided with a frame that has a central axis and a first and second end. Pivotably attached to the first end of the frame is a least one front wheel mounted on a wheel support for rotation about a steering axis. Attached to the second end of the frame is at least one steerable second wheel mounted on a wheel support and rotatable about a steering axis. The trailer is also provided with a tongue which has two ends, and is used to draw the trailer. One end of the tongue is pivotably affixed to the frame generally adjacent the centerline, and the other end is adapted for temporary attachment to a vehicle. The first and second wheel supports are provided with a pulley means for attachment of a cable to cause the rotation of the wheel support about the steering axis. Cable means are provided for connecting the tongue to the pulley means of a first and second wheel supports to rotate same in opposite directions in response to the rotation of the tongue relative to the frame.

BRIEF DESCRIPTION OF THE DRAWINGS

FIG. 1 is a side view of a tracking trailer of the present invention;

FIG. 2 is a bottom view of the trailer of FIG. 1;

BRIEF DESCRIPTION OF THE PREFERRED EMBODIMENT

Figure 3:
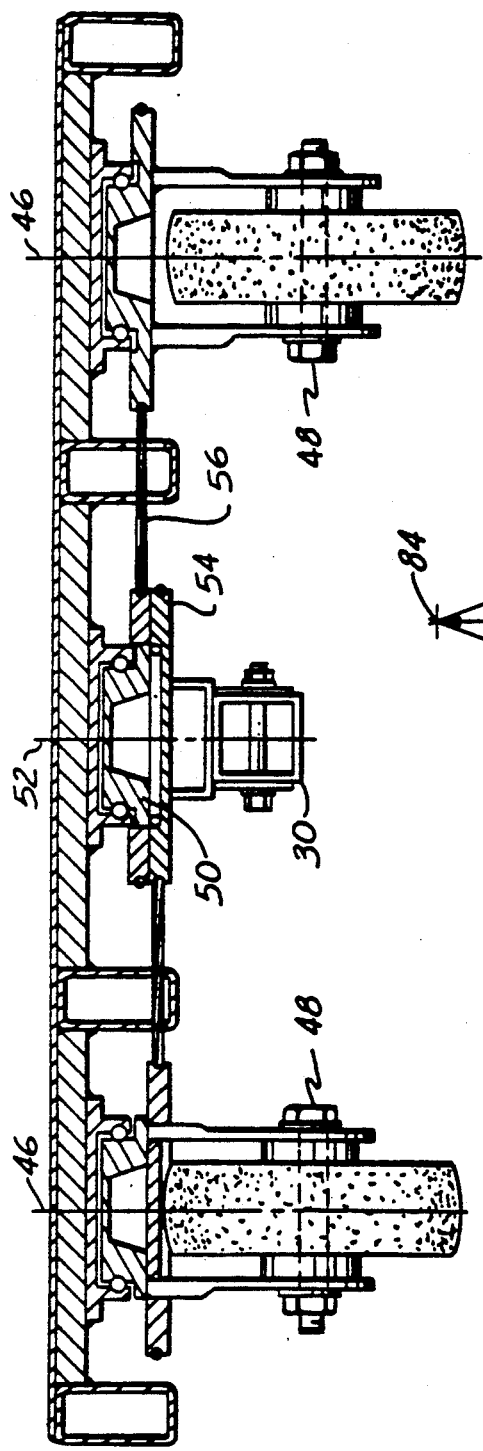
FIG. 3 is a cross-sectional view taken along line 3—3 of FIG. 2.

With reference to the drawings, the first embodiment of the tracking trailer is depicted in FIG. 1-5. The tracking trailer 20 is provided with a frame 22 which is generally rectangular is shape. The frame has a central axis 24 and a first and second end 26 and 28 respectively. The trailer is drawn by tongue 30 which has one end pivotably attached to the frame at pivot point 32, and a second end 34 in the form of a trailer hitch or the like, adapted for temporary attachment to a towing vehicle. The embodiment of the invention shown in FIGS. 1-2 utilizes a tongue having a hinge 36 which enables the tongue to be rotated upward and out of the way when the trailer is not being towed.

The first trailer embodiment 20 is provided with four wheels. A pair of first wheels 38 and 40 are oriented on opposite sides of central axis 24 generally adjacent the trailer first end 26. First wheels 38 and 40 are freely rotatably attached to wheel supports 42 and 44, which in turn are rotatably attached to the frame 22 to enable the wheel supports to be pivoted about a generally vertical steering axis 46. The wheel supports are affixed to the frame using a ball-bearing assembly similar to that used in heavy-duty swivel casters. The structure of the wheel support bearings can be seen in more detail in U.S. Pat. No. 4,316,305, which is incorporated by reference herein. In the present invention, it is preferred that the steering axis 46 of the wheel supports be vertical, i.e., perpendicular to the ground when the trailer is on a flat horizontal surface (unlike many traditional casters). The trailer wheels rotate in a plane which interconnects the respective steering axis, resulting in the wheel axle 48 being horizontal when the trailer is rested on a flat surface.

As best shown in FIG. 3, the trailer tongue 30 is pivotably attached to the frame by a bearing assembly 50 to allow the tongue and trailer to rotate relative to one another about a generally vertical tongue pivot axis. Steering cam 54 is affixed to the tongue and oriented in a plane generally perpendicular to tongue axis 52. The steering cam is attached to a flexible tensile member, such as cable 56, which attaches to each of the four wheel supports, and ultimately, returns and reattaches to the steering cam 54. Each of the wheel supports is provided with a wheel support pulley 58, 60, 62 and 64 which serves as a means for attachment of the cable 56 or such other tensile member which is used. It should be noted, that while the preferred embodiment employs pulleys and a multi-strand steel cable, other flexible tensile members and attachment means which are mechanically equivalent can be used, such as a chain and sprocket, or the like.

Figure 8:
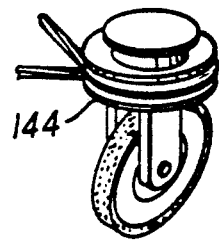
FIG. 8 is an enlarged prospective view of a alternate wheel, wheel support and pulley assembly.

In the preferred first embodiment, the cable 56 wraps around steering pulley 54, and is secured in place by clamp 66 to prevent slippage relative thereto. The cable extends from steering pulley 54 to wheel pulley 60 and the cable is again securely clamped thereto. The cables are then routed to the second end of the trailer and wrapped about wheel pulleys 62 and 64 in such a manner that the second wheels 68 and 70, and their respective wheel supports 72 and 74 will rotate in opposite directions about wheel axis 46 than first wheels 38 and 40. In the embodiment shown, cable 56 is oriented in a generally figure 8 arrangement, as best shown in FIG. 2, with a cable length adjuster 76 provided to secure the cable ends together to form a continuous loop. Cable 56 extends around a significant portion of the periphery of steering pulley 54 and the four wheel pulleys.

Figure 4:
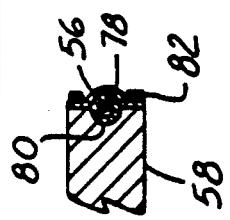
FIG. 4 is an enlarged cross-sectional view taken along line 4—4 of FIG. 2.

In addition to frictionally engaging the pulleys, the pulleys are held in place by a cable stop and clamp combination shown in FIG. 4. A compressible stop sleeve 78 is telescopically positioned on cable 56, and positioned within a locator notch 80 on machined end wheel pulley 58. After the trailer has been fully assembled and the cable installed in proper tension, the wheels are then aligned, and the sleeves 78 are mechanically compressed onto the cable to securely fix the cable relative to its respective wheel pulley. To further negate slippage, the clamp 82 may be employed to hold the cable in place. Stop sleeve 78 is preferably formed of a soft, malleable material, such as the copper stop sleeves available from The National Telephone Supply Company, sold under the trademark Nicopress ®.

In the embodiment of the invention shown in FIGS. 1–4, the steering pulley 54 and the four wheel pulleys 58, 60, 62 and 64 preferably all have equal diameters. Therefore, when the tongue rotates 1° relative to the frame, the front wheels rotate an equal amount in the same direction, and the rear wheels rotate an equal amount in the opposite direction. Since the wheels on the inside turn rotate exactly the same amount as the wheels on the outside turn, the four wheels will not be aligned with the instantaneous center of turn. It should be noted that steering pulley and wheel pulley size will not change if the trailer's track or wheelbase is changed.

Figure 5:
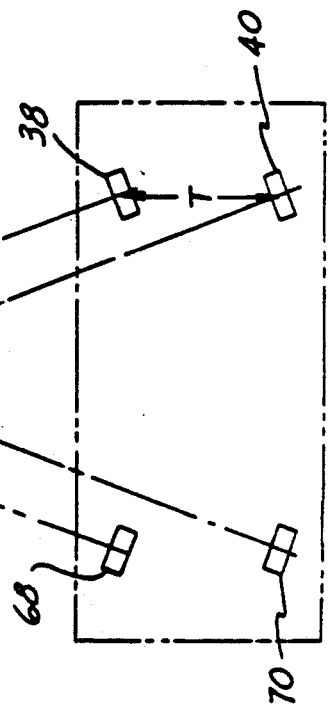
FIG. 5 is a schematic diagram of the trailer during a turning maneuver.

As shown in the schematic diagram of FIG. 5, the wheels on the inside of the turn 38 and 68 are oriented to have their axles aligned with point 84, while the outside wheels 40 and 70 have their axles aligned with point 86. Point 84 and point 86 are spaced apart from one another at a distance X which is equal to the trailer track T. The actual instantaneous center of turn for the trailer will be approximately midway between points 84 and 86, resulting in both the inside and outside wheels scrubbing slightly during turning maneuver. The greater the angle of turn, the greater the amount of scrubbing which will occur. Small amounts of tire scrubbing is not the problem, however, when turns are sharp, tire scrubbing can cause tracking problems, particularly where the coefficient of friction between the wheels and the ground is not uniform.

Figure 6:
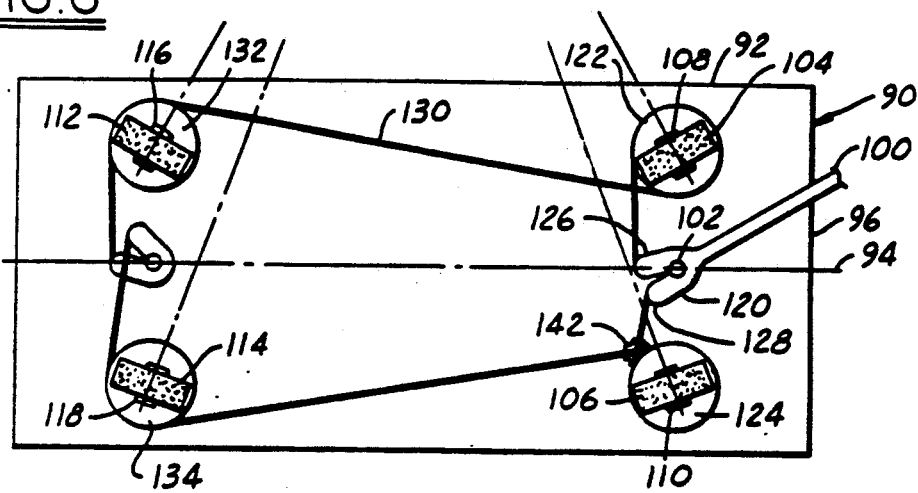
FIG. 6 is a bottom view of an alternate embodiment of the invention.

A second preferred embodiment of the invention is shown in FIG. 6. Trailer 90 is provided with a frame 92 having a frame axis 94, and frame first end 96 and frame second end 98. Tongue 100 is pivotably attached to the frame at tongue pivot point 102. First wheels 104 and 106 are freely pivotably attached to first wheel supports 108 and 110. The first wheels are located generally adjacent the first end 96 of the trailer on opposite sides of frame axis 94. At the second end of the trailer on opposite sides of the frame axis are second wheels 112 and 114 which are freely pivotably supported on the second wheel supports 116 and 118 respectively. The four wheel supports are pivotably attached to frame 92, and rotatable about a generally vertical wheel support axis is a similar fashion as trailer 20 shown in FIG. 1–4.

In the second embodiment, however, rather than having a circular steering pulley, a twin lobe pulley 120 is utilized so that the effective radii from wheel support pivot point 102 to the cable segment extending to first wheel pulley 122, can be different than the radii from tongue pivot point 102 to the cable segment extended to wheel pulley 124. The effective radius of the cable attachment point of the twin lobe pulley 120 will vary as a function of tongue rotation. When the tongue is rotated counter-clockwise as shown during a left turn, lobe 126 will effectively become larger, while lobe 128 will effectively become smaller, resulting in the inside wheel pulley 122 rotating through a greater angle than outside wheel pulley 124. When the tongue is in the straight ahead position, lobes 126 and 128 have the same effective radius. When the tongue rotates clockwise, lobe 128 will be effectively larger than lobe 126, again, resulting in the wheel closest to the inside of the turn rotating greater than the wheel on the outside turn so that the inside and outside wheels will have their axes aligned with the instantaneous effective center of the trailer turn, thereby eliminating wheel scrubbing.

Cable 130 extends from lobe 126 about first wheel pulley 122 and back to second wheel pulley 132. Cable 130 also extends from lobe 128 of the steering pulley to first wheel pulley 124 and back to second wheel pulley 134. Cable 130 extends from second wheel pulleys 132 and 134 to twin lobed idler pulley 136 having two lobes 138 and 140. Idler pulley 136 is generally symmetrical to steering pulley 120 so that the length of the cable segment extending between steering lobe 126 and idler lobe 138, as well as the length of the cable segment extending between steering lobe 128 and idler lobe 140 is substantially constant throughout the range of tongue rotation. By making cable length constant, cable tension can be maintained without the use of spring loaded tensioners or idlers which are not attached to the frame at a fixed pivot. It is important to note that the precise shape of the steering pulley and the idler pulley will vary as a function of the diameter of the wheel pulleys and the trailer track and wheelbase, unlike the first embodiment of the invention.

Figure 7:
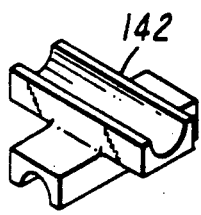
FIG. 7 is a perspective view of a cable wear block.

In order to prevent cable wear caused by cable rubbing, a guide block 142 is provided at the cable intersection adjacent first wheel pulley 124. If wheel pulley 124 has a single groove, cable 130 will tend to rub on itself and the point at which cable segments cross. To prevent wear, a generally X-shaped guide block 142, shown in FIG. 7, is provided formed of a wear resistant material such as nylon, or the like, to prevent direct metal-to-metal contact. An alternative twin pulley design 144, shown in FIG. 8, or a helical pulley design (not shown) could be utilized to eliminate cable interference.

Figure 12:
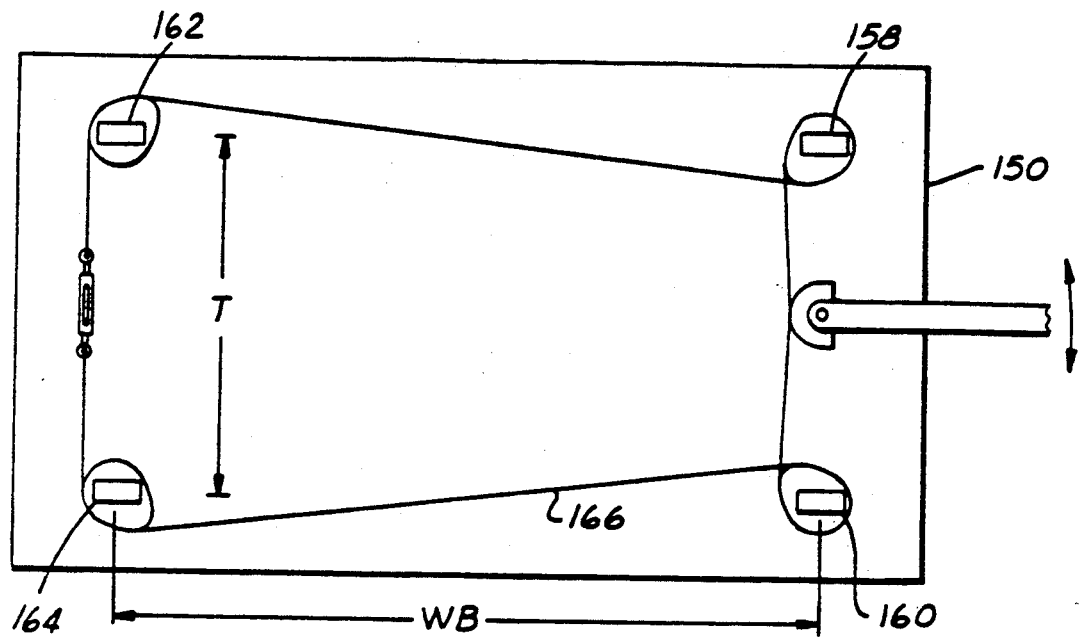
FIG. 12 is a bottom view of yet another alternative embodiment of the invention.
Figure 13:
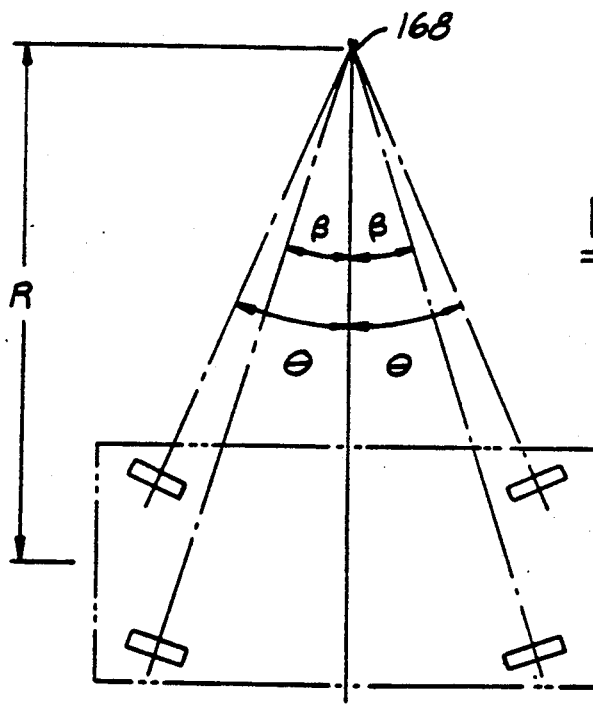
FIG. 13 is a schematic diagram of a trailer during a turning maneuver.

A third alternative of the embodiment of the four wheel trailer design is shown in FIGS. 12-13. Trailer 150 is provided with a frame 152, a tongue 154 pivotably attached to the frame, a steering pulley 156, and four wheel/support/pulley assemblies 158, 160, 162 and 164. A cable 166 extends from the steering pulley about the four lobed shape wheel pulleys. The cable is routed so that the front wheels 158 and 160 are steered in the direction of tongue movement, while the rear wheels 162 and 164 are steered in the opposite direction. Preferably, the four wheel pulleys are symmetrical for easy manufacturing. The wheel pulleys are affixed to the wheel supports and have a profile designed so that the wheel axis will be aligned with the instantaneous center of turn, as depicted in the schematic diagram of FIG. 13. As in the second embodiment of the invention shown in FIG. 6, the wheels on the inside of the turn will rotate more than the wheels on the outside of the turn due to their closer proximity to the instantaneous turn center 168. The inside wheels will rotate in angle $\theta$, and the outside wheels will rotate in angle $\beta$, which will be defined by the instantaneous radius of the turn R and the trailer track T and wheelbase WB:

$\sin\beta = WB/(2R+T)$ $\sin\theta = WB/(2R-T)$

The shape of the wheel pulleys will be dictated by the steering pulley diameter and the trailer track and wheelbase.

Figure 9:
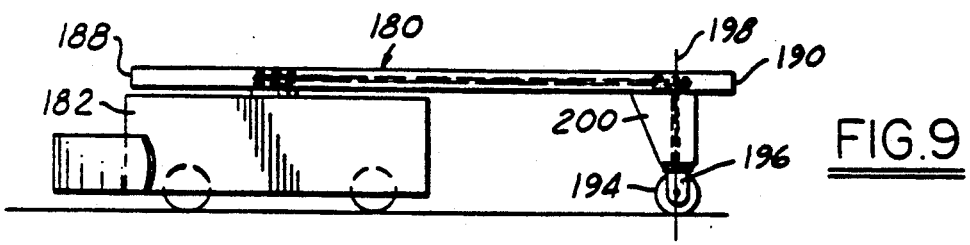
FIG. 9 is a side elevation of an alternate two wheel embodiment of the invention affixed to a towing vehicle.
Figure 10:
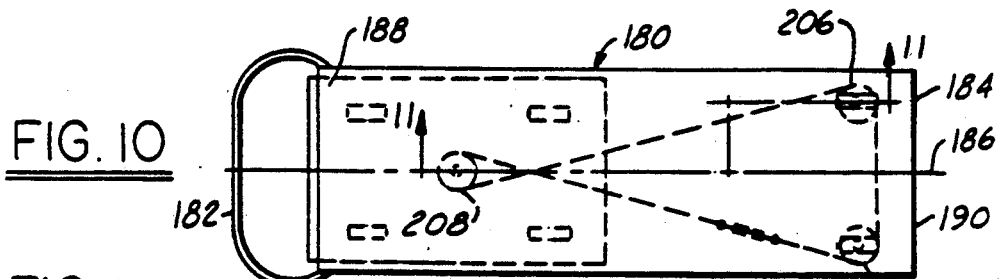
FIG. 10 is a plan view of the trailer - towing vehicle combination of FIG. 9.
Figure 11:
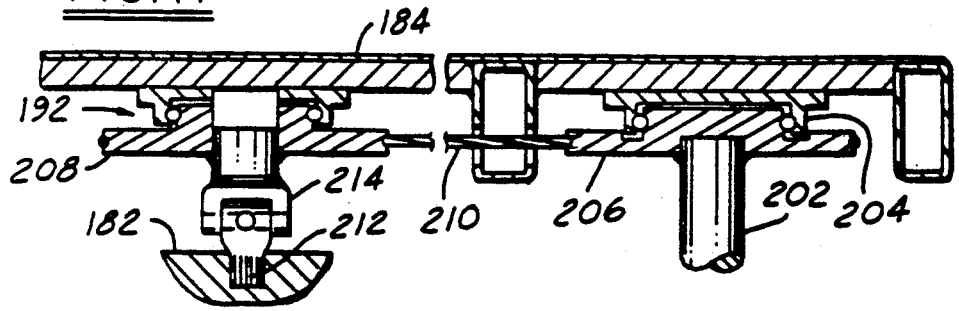
FIG. 11 is an enlarged partial and cross-sectional view taken along line 11—11 of FIG. 10.

A fourth embodiment of the invention, in the form of a two wheel trailer 180, is shown in FIGS. 9-11 attached to a towing vehicle 182. The trailer is provided with a frame 184 having a central axis 186, a first end 188 and a second end 190. The trailer is provided with a fifth wheel assembly 192 which is pivotably attached to the trailer generally adjacent the trailer first end, and which is temporarily securely mounted to towing vehicle 182. When the towing vehicle drawing the trailer 180 turns, the vehicle 182 and the fifth wheel assembly 192 will turn relative to the trailer frame 184. Adjacent the second end of the trailer on opposite sides of the frame axis 186, are located a pair of freely rotatable wheels 194 pivotably attached to wheel supports 196, which is rotatable about a generally vertical wheel support axes 198. In the embodiment shown, the horizontal deck of the trailer is oriented substantially above ground level due to the orientation of the towing vehicle attachment. Therefore, frame legs 200 are affixed to the frame, and wheel supports 196 which are rotatably mounted therein, as shown in FIG. 9. Extending centrally through each leg 200 is a steering shaft 202 attached to a wheel support 196 at its lower end, and pivotably attached to the frame at its upper end by bearing assembly 204. A wheel pulley 206 is attached to shaft 202 for rotation therewith. Fifth wheel assembly 192 is also provided with a fifth wheel steering pulley 208, and cable 210 attaches fifth wheel pulley 208 to wheel pulleys 206 and 206'. The cable is oriented in a generally figure 8 shape so that the trailer wheels 194 are steered in a direction opposite to the relative rotation of fifth wheel assembly 192.

This fifth wheel trailer design is particularly useful with modern, automatic guided vehicles when it is desired to transport long or heavy objects. In order to achieve a secure, temporary attachment of the fifth wheel assembly 192 to the towing vehicle, a spline 212 is utilized. To accommodate minor variations in the inclination of the towing vehicle relative to the trailer due to floor irregularities, an universal joint 214 is incorporated adjacent spline 212 to allow the towing vehicle to pitch and roll relative to the trailer. As in the earlier embodiments, the described cable length is constant, therefore, high cable preload tensions can be utilized to very accurately coordinate the movement of the trailer wheels with that of the towing vehicle without slack and wheel wobble.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

I claim:

1. A steerable trailer to be drawn by a vehicle, comprising:

a frame having a central axis and first and second ends;

a steering pulley pivotably attached to the frame generally adjacent the first end and rotatable relative thereto about a substantially vertical pulley axis;

means for temporarily attaching the steering pulley to the vehicle drawing the trailer to communicate to the steering pulley any angular displacement of the vehicle about the pulley axis;

a pair of steerable wheels each pivotably attached, and generally adjacent, to the frame second end on opposite sides of the central axis, the pair of steerable wheels and the vehicle providing sole support for the trailer;

a wheel support retaining each wheel and which is rotatable relative to the frame about a steering axis;

a wheel pulley coupled to each wheel support; and an endless, flexible tensile member extending about the steering pulley and the wheel pulleys in a figure "8" configuration to cause the wheel pulleys to rotate about their respective steering axes in a direction opposite that of the steering pulley.

2. The invention of claim 1 wherein the means for temporarily attaching the steering pulley includes an universal joint to allow the towing vehicle to pitch and roll relative to the trailer.

3. The invention of claim 1 wherein:
said frame is substantially horizontal and is provided with a flat deck; and
the steerable trailer further comprises a pair of legs each having an upper end attached to the frame and a lower end rotatably attached to a wheel support.

4. The invention of claim 3 further comprising:
a pair of bearing assemblies depending from the frame, each bearing assembly being coaxially aligned with the steering axis of one of the steerable wheels;
a wheel pulley attached to each bearing assembly for coaxial rotation therewith in response to movement of the flexible tensile member; and
a pair of steering shafts each extending centrally through, and being at least partially enclosed by, a leg and generally coaxially with the steering axis of one of the steerable wheels, each shaft being attached to a wheel support at one end and being pivotably supported by the bearing assembly at its other end,
each steering shaft and wheel pulley providing a connection between a wheel support and the flexible tensile member.

5. A steerable trailer to be drawn by a vehicle, comprising:
an elongated substantially horizontal frame having a central axis and first and second ends;
a steering pulley pivotably attached to the frame generally adjacent the first end and rotatably relative thereto about a substantially vertical pulley axis;
means for temporarily attaching the steering pulley to the vehicle drawing the trailer to communicate to the steering pulley any angular displacement of the vehicle about the pulley axis;
a pair of legs each attached, and generally adjacent, to the frame second end on opposite sides of the central axis and extending downwardly therefrom;
a pair of steerable wheels each pivotably attached to a leg by a wheel support which is rotatably relative to the frame about a steering axis, the pair of steerable wheels and the vehicle providing sole support for the trailer;
a pair of steering shafts each attached at its lower end to a wheel support, and extending substantially upwardly coaxially with the steering axis;
a pair of wheel pulleys, each wheel pulley being attached to the upper end of a steering shaft; and
a cable directly interconnecting the steering pulley and the wheel pulleys, the cable extending about the steering pulley and the wheel pulleys in a figure "8" configuration to cause the wheel pulleys and steering shafts to rotate about their respective steering axes in a direction opposite that of the steering pulley.

* * * * *

UNITED STATES PATENT AND TRADEMARK OFFICE
CERTIFICATE OF CORRECTION

PATENT NO. : 5,033,763
DATED : July 23, 1991
INVENTOR(S) : Vern A. Daenens

It is certified that error appears in the above-identified patent and that said Letters Patent is hereby corrected as shown below:

On the title page, delete the name of John E. Nemazi as an inventor.

Column 8, line 4, claim 5, "rotatably" should be --rotatable--.

Signed and Sealed this

Twenty-second Day of December, 1992

Attest:

DOUGLAS B. COMER

*Attesting Officer*  Acting Commissioner of Patents and Trademarks